(12) United States Patent
Chang

(10) Patent No.: US 9,261,704 B2
(45) Date of Patent: Feb. 16, 2016

(54) STEREOSCOPIC DISPLAY AND STEREOSCOPIC DISPLAY DEVICE

(71) Applicant: Au Optronics Corporation, Hsinchu (TW)

(72) Inventor: Ching-Tsun Chang, Tainan (TW)

(73) Assignee: Au Optronics Corporation, Hsinchu (TW)

( * ) Notice: Subject to any disclaimer, the term of this patent is extended or adjusted under 35 U.S.C. 154(b) by 46 days.

(21) Appl. No.: 13/778,117

(22) Filed: Feb. 27, 2013

(65) Prior Publication Data
US 2014/0036173 A1 Feb. 6, 2014

(30) Foreign Application Priority Data
Aug. 3, 2012 (TW) .............................. 101128093 A

(51) Int. Cl.
G02F 1/13 (2006.01)
G02B 27/22 (2006.01)

(52) U.S. Cl.
CPC .................................. *G02B 27/2214* (2013.01)

(58) Field of Classification Search
CPC .................. G02F 1/1323; G02F 2001/134318; G02B 27/2214
USPC .................................................. 349/15, 200
See application file for complete search history.

(56) References Cited

U.S. PATENT DOCUMENTS

| 5,315,377 | A | 5/1994 | Isono et al. |
| 6,496,218 | B2 | 12/2002 | Takigawa et al. |
| 7,825,999 | B2 | 11/2010 | Chestak et al. |
| 7,961,260 | B2 | 6/2011 | Huang et al. |
| 2002/0113867 | A1 | 8/2002 | Takigawa et al. |
| 2010/0039573 | A1 | 2/2010 | Park et al. |
| 2010/0110316 | A1* | 5/2010 | Huang et al. ..................... 349/15 |
| 2011/0085094 | A1* | 4/2011 | Kao et al. ........................ 349/5 |
| 2011/0157171 | A1 | 6/2011 | Lin |

(Continued)

FOREIGN PATENT DOCUMENTS

| CN | 103076679 | 5/2013 |
| JP | 10-232626 | 9/1998 |

(Continued)

OTHER PUBLICATIONS

"Office Action of Taiwan Counterpart Application", issued on Jun. 11, 2014, p. 1-p. 6.
"First Office Action of China Counterpart Application", issued on May 28, 2014, p.1-p.6.

*Primary Examiner* — James Dudek
(74) *Attorney, Agent, or Firm* — Jianq Chyun IP Office

(57) ABSTRACT

A stereoscopic display including a display panel and a barrier panel is provided. The barrier panel is at one side of the display panel. The barrier panel includes first and second substrates, first and second patterned electrode layers, and a liquid crystal layer between the first and second patterned electrode layers. The first patterned electrode layer is on the first substrate, and includes first electrodes having a first line-width. A gap between the adjacent first electrodes is a first spacing, and a first pitch is a sum of the first spacing and pitch. The second patterned electrode layer is on the second substrate, includes second electrodes having the first line-width. The gap between the adjacent second electrodes is the first spacing, the first and second electrodes are staggered to each other, and a shift in a horizontal direction between the first and second electrodes is half of the first pitch.

22 Claims, 6 Drawing Sheets

(56) References Cited

U.S. PATENT DOCUMENTS

2012/0013606 A1\* 1/2012 Tsai et al. .................... 345/419
2012/0229718 A1\* 9/2012 Huang et al. .................. 349/15
2013/0100101 A1   4/2013 Li et al.
2014/0192172 A1\* 7/2014 Kang et al. ..................... 348/55

FOREIGN PATENT DOCUMENTS

| TW | 201019018 | 5/2010 |
| TW | 201232133 | 8/2012 |
| WO | WO2012044130 A2 \* | 5/2012 |

\* cited by examiner

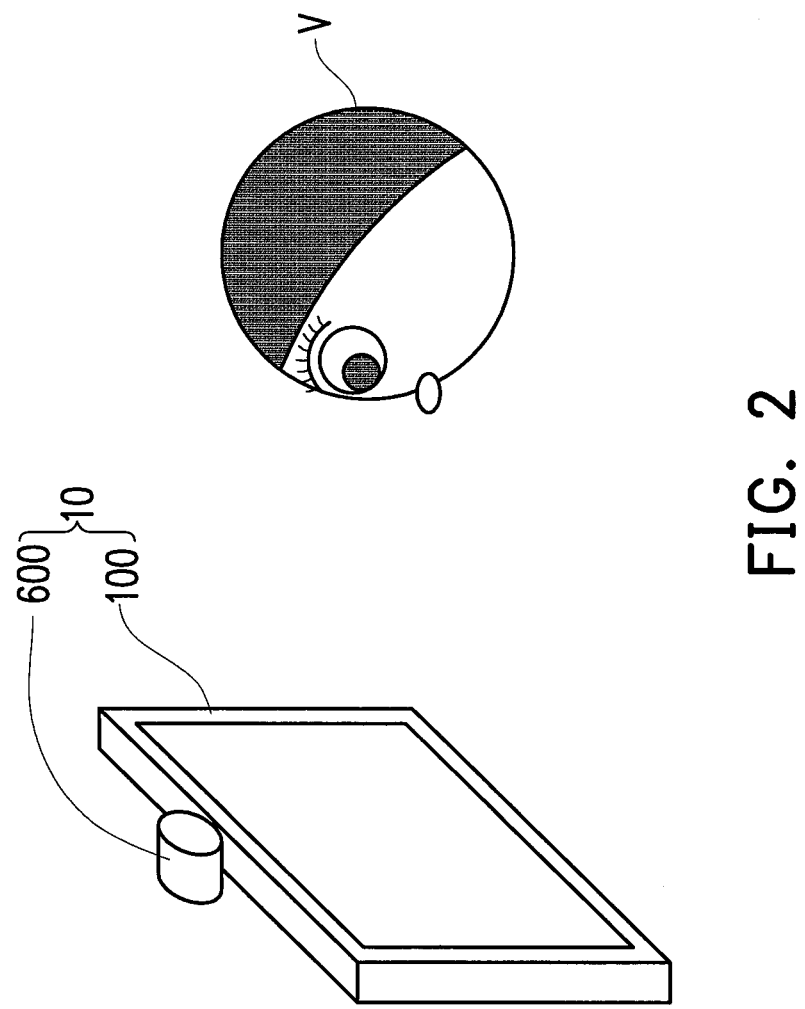

STEREOSCOPIC DISPLAY AND STEREOSCOPIC DISPLAY DEVICE

CROSS-REFERENCE TO RELATED APPLICATION

This application claims the priority benefit of Taiwan application serial no. 101128093, filed on Aug. 3, 2012. The entirety of the above-mentioned patent application is hereby incorporated by reference herein and made a part of this specification.

TECHNICAL FIELD

The disclosure relates to a display and a display device, and particularly relates to a stereoscopic display and a stereoscopic display device.

BACKGROUND

In recent years, continuous advancement of display technology results in increasing demands on display quality of displays (e.g. image resolution, color saturation) from users. However, in addition to high image resolution and high color saturation, displays capable of displaying stereoscopic images are also developed to satisfy the users' need of viewing real images.

The stereoscopic display technology that is developed more rapidly and completely is the spatial-multiplexed technology. In the spatial-multiplexed technology, a parallax barrier or a columnar lens is frequently used to form different viewing zones in the space for the viewer to receive different image information for his/her left eye and right eye, so as to achieve the stereoscopic effect. The technology of manufacturing barriers is more well-developed than the technology of manufacturing lenses, so the former is broadly applied in products.

Specifically, the parallax barrier is a periodic structure in which a transparent area and a non-transparent area alternately appear. The parallax barrier has an appropriate pitch and is laminated to an image cell in an appropriate distance. It is necessary for the image cell to simultaneously display images for the left and right eyes of the viewer which are alternately arranged. Thereby, after the image cell is laminated with the parallax barrier, the left eye of the viewer only sees the pixel displaying the left eye image, whereas the right eye of the viewer only sees the pixel displaying the right eye image. This indicates that due to a shading effect of the non-transparent area of the parallax barrier, the left eye is not able to see the pixel displaying right eye image. The same applies to the right eye. Therefore, when the image cell displays an image, the viewer is allowed to view a stereoscopic image at an appropriate location.

Taking a 2-view stereoscopic display for example, since the parallax barrier and pixel are both periodic structures, left and right image areas projected by the barrier periodically appear in the space. Namely, alternate left and right image areas are projected. Therefore, the left and right eyes of the viewer have to correspond to the left and right image areas to see a preferable stereoscopic image, or the left eye may see the right eye image, while the right eye may see the left eye image. This phenomenon is described as crosstalk. For example, when the viewer is located at a location corresponding to center of the display (i.e. center location), since the left eye falls in the center of the left eye image area and the right eye falls in the center of the right eye image area, the viewer is allowed to see a preferable stereoscopic image. Therefore, this viewing location is the appropriate viewing location that has minimal or hardly any crosstalk. However, when the viewer moves leftward or rightward from the center location, rendering the left eye falling in the center of the right eye image area and the right eye falling in the center of left eye image area, the viewer feels uncomfortable because of viewing an incorrect stereoscopic image. The phenomenon is described as pseudoscopy, and the area that leads the viewer to have a pseudoscopic vision is called dead zone. Crosstalk in the dead zone is much higher than the center area and causes discomfort of the viewer.

Since the stereoscopic display is limited by the so-called appropriate viewing location, making the viewer prone to feel fatigue when viewing, the willingness of the viewer to use the stereoscopic display is decreased. Therefore, reducing crosstalk to develop the stereoscopic display technology free of limitation on viewing location is one of the issues that the related industry has to work on.

SUMMARY

The disclosure provides a stereoscopic display, which provides a stereoscopic image quality with low crosstalk.

The disclosure also provides a stereoscopic display device, which provides a preferable stereoscopic image quality according to location of a viewer.

The disclosure provides a stereoscopic display, including a display panel and a barrier panel. The barrier panel is located at one side of the display panel. The barrier panel includes a first substrate, a first patterned electrode layer, a second substrate, a second patterned electrode layer, and a liquid crystal layer. The first patterned electrode layer is disposed on the first substrate and includes a plurality of first electrodes. Each of the first electrodes has a first line-width, wherein a gap between the adjacent first electrodes is a first spacing, and a first pitch is a sum of the first line-width and the first spacing. The second substrate is disposed opposite to the first substrate. The second patterned electrode layer is disposed on the second substrate and includes a plurality of second electrodes, and each of the second electrodes has the first line-width, wherein the gap between the adjacent second electrodes is the first spacing, the first electrodes and the second electrodes are staggered to each other, and a shift on a horizontal direction of the second electrodes relative to the first electrodes is half of the first pitch. The liquid crystal layer is disposed between the first patterned electrode layer and the second patterned electrode layer.

The disclosure also provides a stereoscopic display device, including the stereoscopic display and an eye-tracker. The eye-tracker detects a relative location between a viewer and the display panel, wherein driving of the barrier panel is synchronized with detection of the eye-tracker.

Based on the above, in the stereoscopic display and stereoscopic display panel of the disclosure, the electrode layers of the barrier panel are designed as having an appropriate configuration and arrangement. Thereby, driving the electrode layers of the barrier panel when the eye-tracker is used allows the stereoscopic display to provide a stereoscopic image with preferable quality.

To make the aforementioned and other features and advantages of the invention more comprehensible, embodiments accompanied with figures are described in detail below.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 2 is a schematic view of a stereoscopic display device according to an embodiment of the disclosure.

DETAILED DESCRIPTION OF DISCLOSED EMBODIMENTS

Figure 1A:
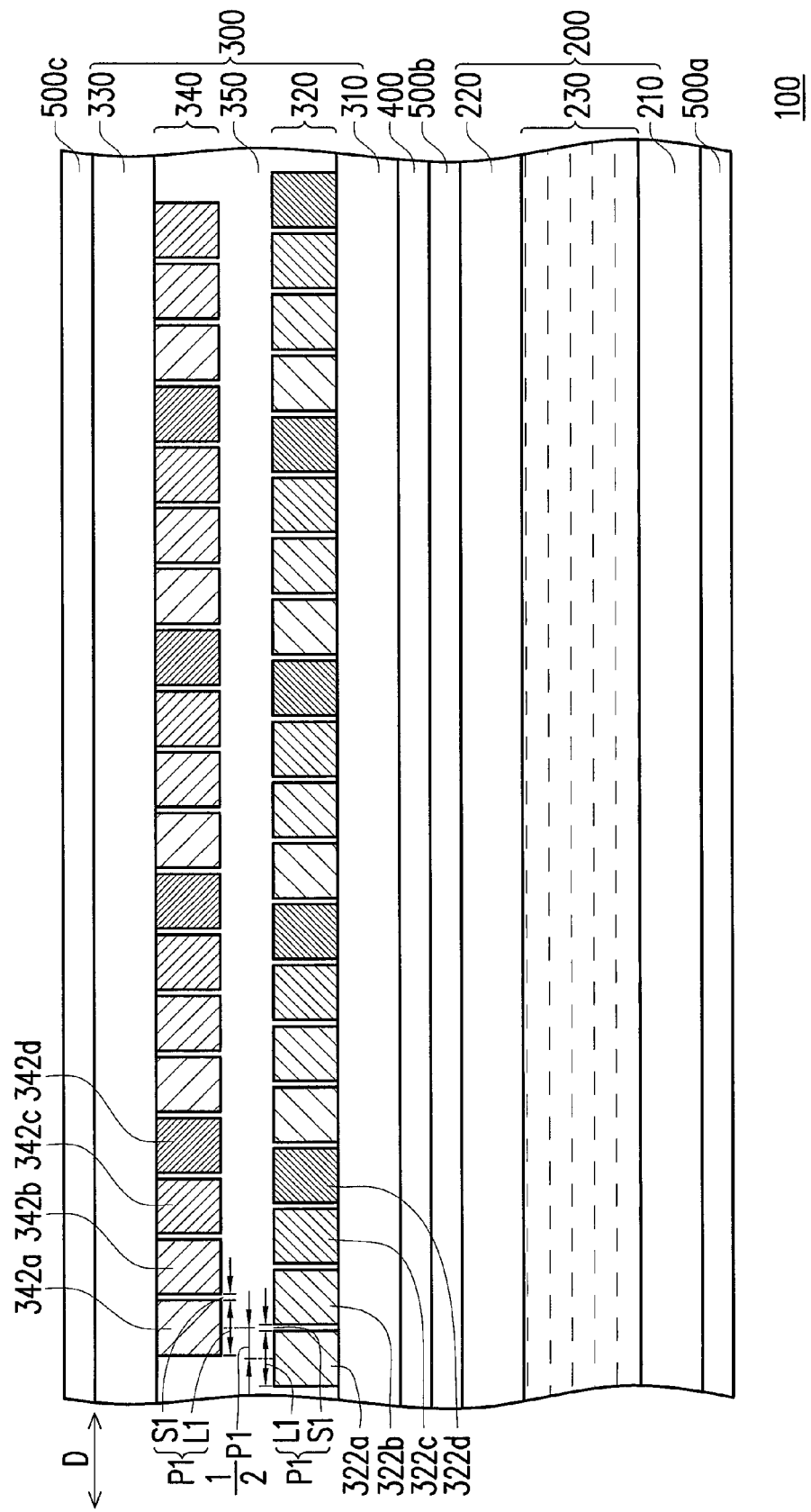
FIG. 1A is a cross-sectional schematic view of a stereoscopic display according to an embodiment of the disclosure.
Figure 1B:
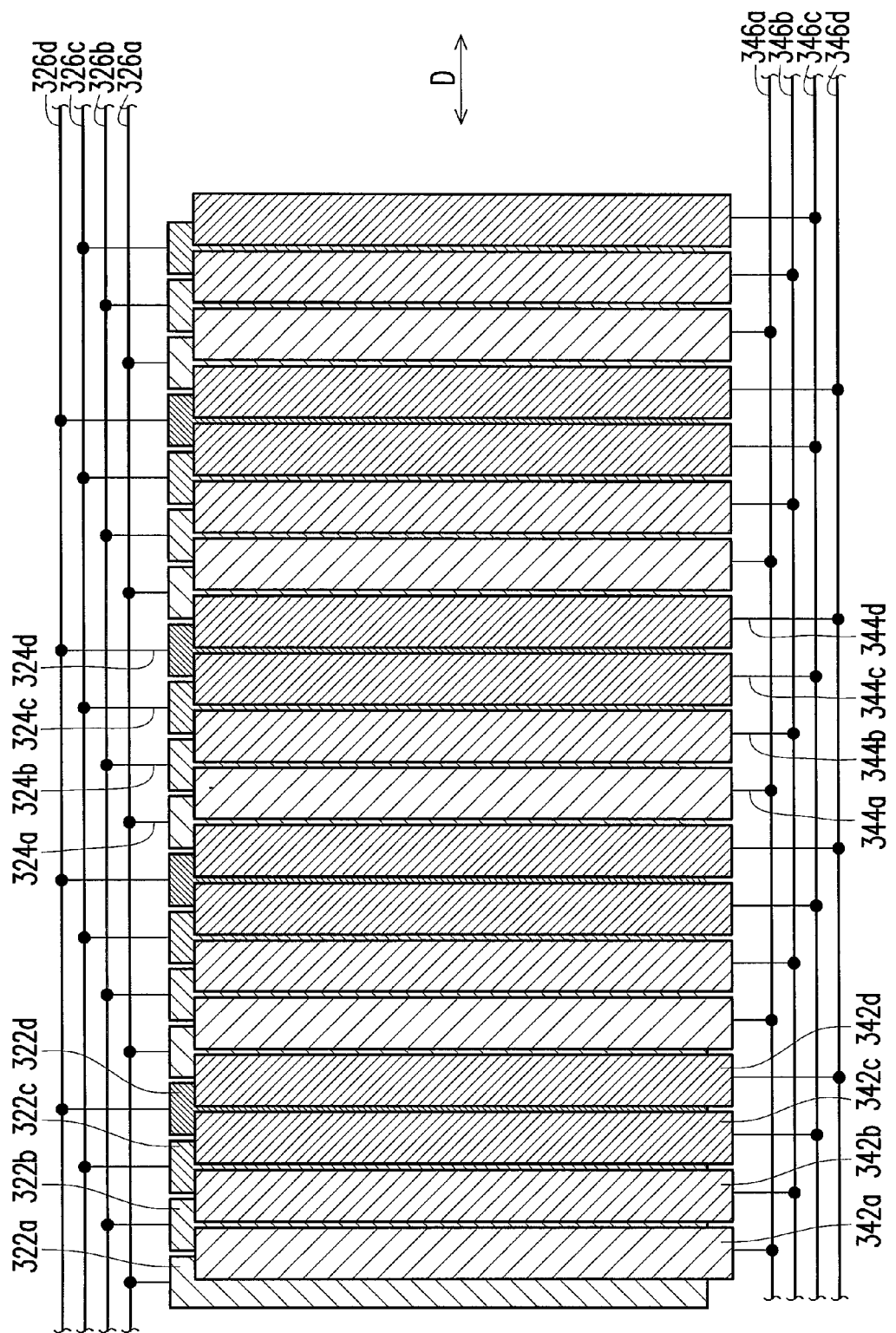
FIG. 1B is a top schematic view of a first patterned electrode layer and a second patterned electrode layer of FIG. 1A.

FIG. 1A is a cross-sectional schematic view of a stereoscopic display according to an embodiment of the disclosure, and FIG. 1B is a top schematic view of a first patterned electrode layer and a second patterned electrode layer of FIG. 1A. Referring to FIG. 1A, a stereoscopic display 100 includes a display panel 200 and a barrier panel 300. The barrier panel 300 is located at one side of the display panel 200. In this embodiment, the barrier panel 300 is, for example, disposed over the display panel 200. The barrier panel 300 includes a first substrate 310, a first patterned electrode layer 320, a second substrate 330, a second patterned electrode layer 340, and a liquid crystal layer 350. The second substrate 330 is disposed opposite to the first substrate 310. The liquid crystal layer 350 is located between the first substrate 310 and the second substrate 330 and between the first patterned electrode layer 320 and the second patterned electrode layer 340. The first substrate 310 and the second substrate 330 are, for example, glass substrates or plastic substrates. In other embodiments, the first substrate 310 and the second substrate 330 may be a transparent substrate formed of other materials. The liquid crystal layer 350 is, for example, a nematic positive liquid crystal or nematic negative liquid crystal.

Referring to FIGS. 1A and 1B, the first patterned electrode layer 320 is disposed on the first substrate 310 and includes a plurality of first electrodes 322a-322d. Each of the first electrodes 322a-322d has a first line-width L1, wherein a gap between the adjacent first electrodes 322a-322d is a first spacing S1, and a first pitch P1 is a sum of the first line-width L1 and the first spacing S1. In this embodiment, the first line-width L1 is, for example, between 32.5 μm and 35 μm. The first spacing S1 is, for example, between 0 μm and 6 μm. The first pitch P1 is, for example, between 3.5 μm and 6 μm.

In this embodiment, the first patterned electrode layer 320, for example, includes M electrode set(s) and each electrode set, for example, includes N first electrodes 322a-322d, wherein M and N are positive integers, and N, for example, is an integer greater than or equal to 4. In this embodiment, N=4 is used as an example for illustration. In other words, an electrode set, for example, includes four first electrodes 322a-322d. Naturally, in other embodiments, an electrode set may include 5, 6, 7, or 8 first electrodes. In this embodiment, the first electrodes 322a-322d, for example, includes a plurality of strip electrodes arranged along a horizontal direction D. The first electrodes 322a-322d, for example, are arranged parallel to each other. In addition, the first electrodes 322a-322d are, for example, connected to common lead wires 326a-326d through connecting lines 324a-324d. Specifically, the first electrodes 322a-322d are, for example, respectively driven via the common lead wires 326a-326d. Therefore, there are N groups formed for driving, for example. In this embodiment, four groups are formed for driving, for example. A material of the first electrodes 322a-322d is, for example, indium tin oxide (ITO), indium zinc oxide (IZO), or other appropriate transparent conductive materials.

The second patterned electrode layer 340 is disposed on the second substrate 330 and includes a plurality of second electrodes 342a-342d. Each of the second electrodes 342a-342d has the first line-width L1, wherein the gap between the adjacent second electrodes 342a-342d is the first spacing S1, the first electrodes 322a-322d and the second electrode 342a-342d are staggered to each other, and a shift on a horizontal direction D of the second electrodes 342a-342d relative to the first electrodes 322a-322d is half of the first pitch P1 (i.e. ½ P1). In other words, the second electrodes 342a-342d and the first electrodes 322a-322d have the first line-width L1, and the gap between the adjacent first electrodes 322a-322d and the gap between the second electrodes 342a-342d are the first spacing S1. Therefore, the first electrodes 322a-322d and the second electrodes 342a-342d have a substantially identical configuration. In this embodiment, the first line-width L1 is, for example, between 32.5 μm and 35 μm. The first spacing S1 is, for example, 0 μm and 6 μm. The first pitch P1 is, for example, between 3.5 μm and 6 μm.

In this embodiment, the second patterned electrode layer 340, for example, includes M electrode set(s) and each electrode set, for example, includes N second electrodes 342a-342d, wherein M and N are positive integers, and N, for example, is an integer greater than or equal to 4. In this embodiment, N=4 is used as an example for illustration. In other words, an electrode set, for example, includes four second electrodes 342a-342d. Naturally, in other embodiments, an electrode set may include 5, 6, 7, or 8 second electrodes. In this embodiment, the second electrodes 342a-342d, for example, includes a plurality of strip electrodes arranged along the horizontal direction D. The second electrodes 342a-342d, for example, are arranged parallel to each other. In addition, the second electrodes 342a-342d are, for example, connected to common lead wires 346a-346d through connecting lines 344a-344d. Specifically, the second electrodes 342a-342d are, for example, respectively driven via the common lead wires 346a-346d. Therefore, there are N groups formed for driving, for example. In this embodiment, four groups are formed for driving, for example. A material of the second electrodes 342a-342d is, for example, indium tin oxide (ITO), indium zinc oxide (IZO), or other appropriate transparent conductive materials.

In this embodiment, each of the first electrodes 322a-322d and the corresponding second electrodes 342a-342d are staggered to each other on the horizontal direction D with a distance of ½ P1. For example, the first electrode 322a and the second electrode 342a are staggered on the horizontal direction D with a distance of ½ P1. The same arrangement applies to rest of the first electrodes 322a-322d and the second electrodes 342a-342d. In this embodiment, each of the second electrodes 342a-342d is, for example, correspondingly overlapped with two of the first electrodes 322a-322d that are adjacent. For example, the second electrode 342a is correspondingly overlapped with the two first electrodes 322a and 322b that are adjacent, whereas the second electrode 342b is correspondingly overlapped with the two first electrodes 322b and 322c that are adjacent. The same arrangement applies to rest of the first electrodes 322a-322d and the second electrodes 342a-342d. It should be noted that even though the first electrodes 322a-322d and the second electrodes 342a-342d belong to different layers, the first electrodes 322a-322d and the second electrodes 342a-342d are not only allowed to be tightly arranged but maintain an appropriate line-width from each other by using the staggered arrangement in which the first electrodes 322a-322d and the second electrodes 342a-342d are overlapped in the space. Namely, the design of upper and lower patterned electrode layers not only allows a tight arrangement of electrodes but avoid manufacturing electrodes with an overly minimized line-width, which faces the problem of line-width limitation. Therefore, flexibility in manufacturing process of an electrode layer is largely improved. It should also be noted that considering the existence of displacement error, a tolerated error of the shift on the horizontal direction D of the second electrodes 342a-342d relative to the first electrodes 322a-322d is less than or equal to 5 μm. In other words, the shift on the horizontal direction D of the second electrodes 342a-342d relative to the first electrodes 322a-322d is, for example, ½ P1±5 μm.

In this embodiment, the first electrodes 322a-322d of the first patterned electrode layer 320 are, for example, respectively driven via the common lead wires 326a-326d. Therefore, N groups are formed for driving, for example. The second electrodes 342a-342d of the second patterned electrode layer 340 are, for example, respectively driven via the common lead wire 346a-346d. Therefore, N groups are formed for driving, for example. Namely, there are 2N groups of driving signals in total. In this embodiment, there are, for example, 8 groups of driving signals in total.

The display panel 200, for example, includes a pair of substrates 210 and 220, and a display medium layer 230 disposed between the pair of substrates 210 and 220. The substrate 210 is, for example, a pixel array substrate that has a plurality of pixels. Each of the pixels, for example, includes an active device, a pixel electrode electrically connected to the active device, and a signal line (including a data line and a scan line). The substrate 220 is, for example, a color filter substrate, which has a plurality of color filter patterns for example. The display medium layer 230 is a liquid crystal layer, for example. The display panel 200 may be any component capable of displaying an image, such as a liquid crystal display panel, an organic light-emitting display panel, a plasma display panel, an electrophoretic display panel, a field emission display panel, or any other types of display panel, wherein when the display panel 200 uses a non-self-light-emitting material (e.g. liquid crystal) as display medium, the stereoscopic display 100 may selectively include a light source module to provide a light source necessary for display.

In this embodiment, the stereoscopic display 100, for example, further includes an adhesive layer 400 for adhering the display panel 200 and the barrier panel 300. The stereoscopic display 100, for example, further includes polarizers 500a, 500b, and 500c, which are respectively disposed on surfaces of the display panel 200 and the barrier panel 300.

In this embodiment, a display surface of the display panel 200 faces the barrier panel 300. Namely, the barrier panel 300 is disposed over the display panel 200. In this way, after the display panel 200 is laminated to the barrier panel 300, through operation of the barrier panel 300 (described below), the left eye of the viewer only sees a pixel that displays a left eye image and the right eye of the viewer only sees a pixel that displays a right eye image. Thereby, an effect of stereoscopic image is generated.

In the following, a stereoscopic display device having the stereoscopic display used with an eye-tracker is taken to describe operation of the stereoscopic display. FIG. 2 is a schematic view of a stereoscopic display device according to an embodiment of the disclosure. Referring to FIG. 2, a stereoscopic display device 10 includes the stereoscopic display 100 and an eye-tracker 600. The eye-tracker 600 is used to detect a relative location between a viewer V and the display panel 200, wherein driving of the barrier panel 300 is synchronized with detection of the eye-tracker 600. The eye-tracker 600 is, for example, a camera lens or a Gravity-sensor (G-sensor). This is to say, the eye-tracker 600 provides a signal to drive the barrier panel 300 according to a location of the eyes of the viewer V, such that the left eye of the viewer V falls on a left eye image area, whereas the right eye of the viewer V falls on a right eye image area. Thereby, the viewer V is allowed to view a stereoscopic image with less or hardly any crosstalk.

Figure 3A:
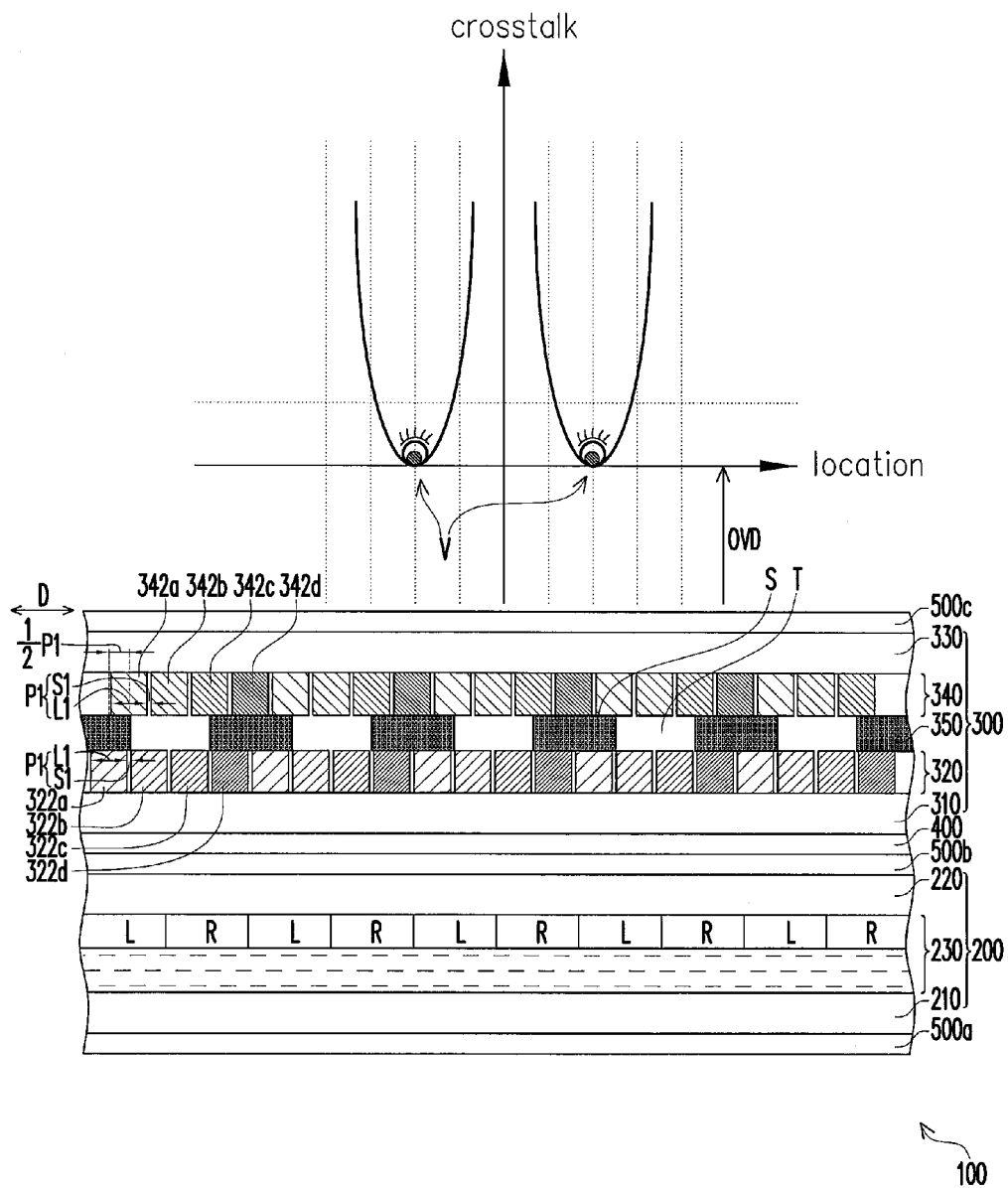
FIG. 3A is a schematic view illustrating operation of the stereoscopic display used with an eye tracker.
Figure 3B:
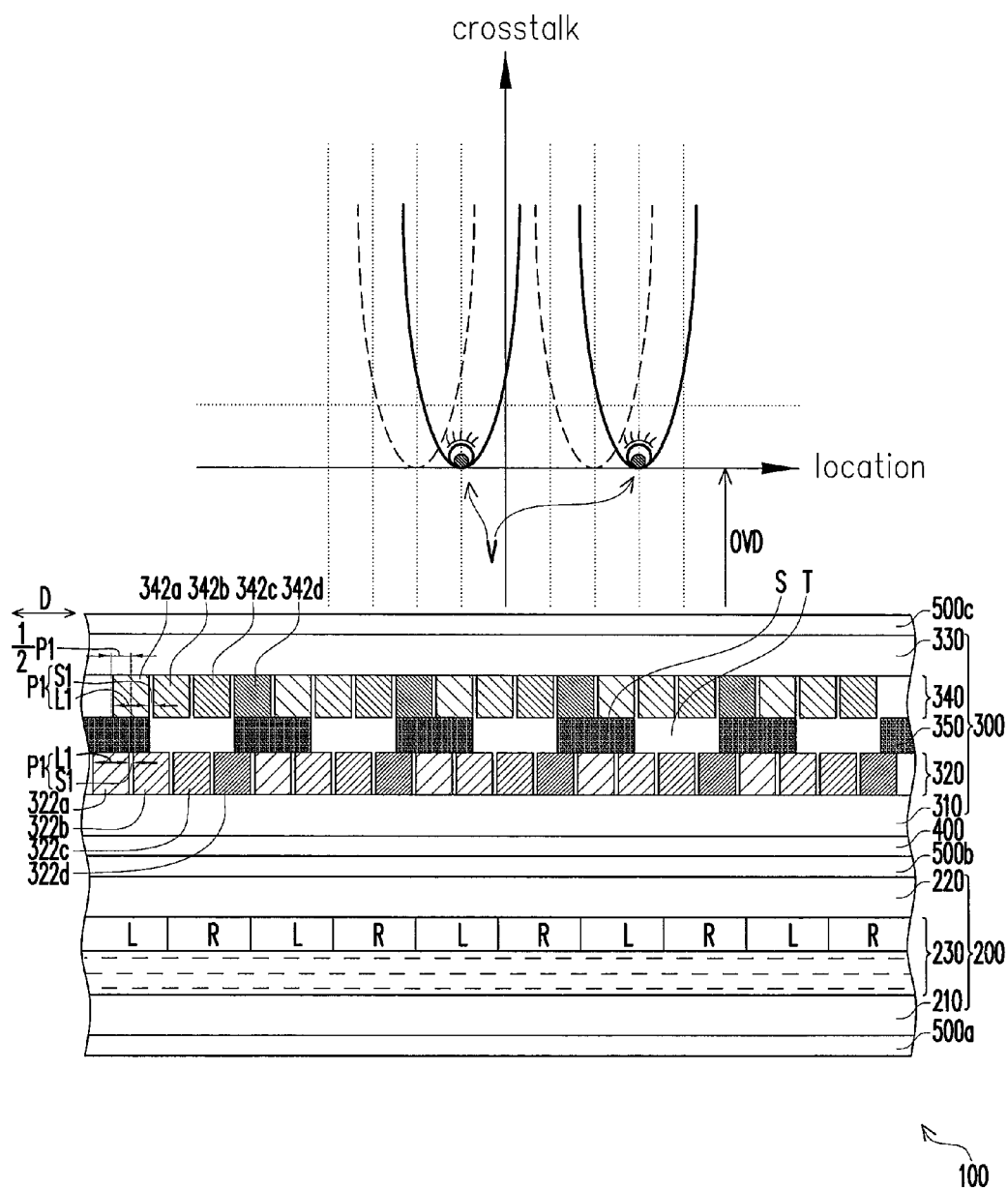
FIG. 3B is a schematic view illustrating operation of the stereoscopic display used with an eye tracker.

FIGS. 3A and 3B are schematic diagrams illustrating operation of the stereoscopic display used with an eye-tracker for describing a driving process of the stereoscopic display. Specifically, the bottom of FIGS. 3A and 3B illustrate the stereoscopic display 100, and the top of FIGS. 3A and 3B illustrates a relation between light fields of the left and right eye images projected by the stereoscopic display 100 and crosstalk. L and R in the display panel 200 respectively represent pixels projecting the left and right eye images. In addition, a corresponding barrier effect is illustrated in the liquid crystal layer 350 of the barrier panel 300, wherein a gray area indicates a shaded area, a blank area between gray areas indicates a transparent area, and OVD indicates the optimal viewing distance. Referring to FIG. 3A, first, when the viewer V is located at a center location relative to the stereoscopic display 100, a first electric potential is applied to the first electrodes 322a and 322d, while a common electric potential (Com) is applied to the first electrodes 322b and 322c as well as the second electrodes 342a-342d, wherein the first electric potential is higher or lower than the common electric potential. In this embodiment, the first electric potential is, for example, 5V, whereas the common electric potential is, for example, 0V. At this time, taking the liquid crystal layer 350 being a nematic liquid crystal for example, a gray level of liquid crystal particles corresponding to the first electrodes 322b and 322c is, for example, 255 levels. Due to an electric potential difference, a gray level of liquid crystal particles corresponding to the first electrodes 322a and 322d is 0 level. In other words, the liquid crystal particles corresponding to the first electrodes 322b and 322c form a transparent area T, the liquid crystal particles corresponding to the first electrodes 322a and 322d form a shaded area S, and the transparent area T and shaded area S are in an alternate arrangement. At this time, an equivalent barrier effect generated and the light fields of the left and right eye images projected by the barrier panel 300 are shown in FIG. 3A. Through illustration of FIG. 3A, it is known that crosstalk of the light fields of the left and right eye images received by the viewer V is substantially zero when the viewer V is at the center location. Namely, the viewer is allowed to see a stereoscopic image with a preferable quality.

Then, when the viewer V moves rightward relative to the location illustrated in FIG. 3A to a location indicated in FIG. 3B, the barrier panel 300 is driven to alternatively apply the first electric potential to the second electrodes 342a and 342d, and simultaneously apply the common electric potential (Com) to the second electrodes 342b and 342c as well as the first electrodes 322a-322d, wherein the first electric potential is higher or lower than the common electric potential. In this embodiment, the first electric potential is, for example, 5V, whereas the common electric potential is, for example, 0V. At this time, compared with the equivalent barrier effect shown in FIG. 3A, an equivalent barrier effect generated right-moves a distance of half of a pitch P1 (i.e. ½ P1). In other words, the optimal viewing area projected is moved in accordance with the viewer V. This indicates that a curve of crosstalk moves from a location indicated with a broken line to a location indicated with an unbroken line. Such inference is further generalized to the situation in which the barrier panel 300 is synchronized driven with detection of the eye-tracker 600, wherever the viewer V moves to, the eyes of the viewer V fall in the optimal viewing area.

It should be noted that if a total width of the plurality of the first electrodes 322a-322d is equal to a width W of a single electrode of the conventional 2-view barrier, the line-width L1 of each of the first electrodes 322a-322d and the second electrodes 342a-342d is, for example, 1/N of W in this embodiment. Moreover, with the driving described above, a moving effect equivalent to a distance of ½N of a 2-view barrier pitch is generated. For example, a moving effect equivalent to a distance of ⅛ of the 2-view barrier pitch is generated in this embodiment.

Then, an optical effect rendered by the design of N=4 is further explicated in the following. By observing FIG. 3B, it is known that when electrodes applied with the first electric potential change from the first electrodes 322a and 322d to the second electrodes 342a and 342d, and a width of an area originally having information for a single eye is defined as WS, areas having left and right eye image information projected through the barrier panel 300 right-shifts a distance of WS/4 in the space. This indicates that the electrode design of N=4 divides the area having information for a single eye into four parts. When the viewer V moves, the barrier panel 300 synchronized driven in accordance with digitally tracking his/her eyes by the eye-tracker 600, and the areas having the left and right eye image information left- or right-moves a distance of WS/4 at the same time. Naturally, based on a location to which the viewer moves, the areas having the left and right eye image information may move a distance of two times of WS/4, three times of WS/4, and so on in one time. Moreover, when crosstalk needs to be further reduced in some applications, a gray level of liquid crystal corresponding to a width of three electrodes may be set at 0 level in one time. For example, the first electrodes 322a, 322b, and 322c are applied with the first electric potential. Meanwhile, the first electrode 322d and the second electrodes 342a-342d are applied with the common electric potential. Thereby, a non-transparent area may be increased so that crosstalk is reduced.

Figure 4:
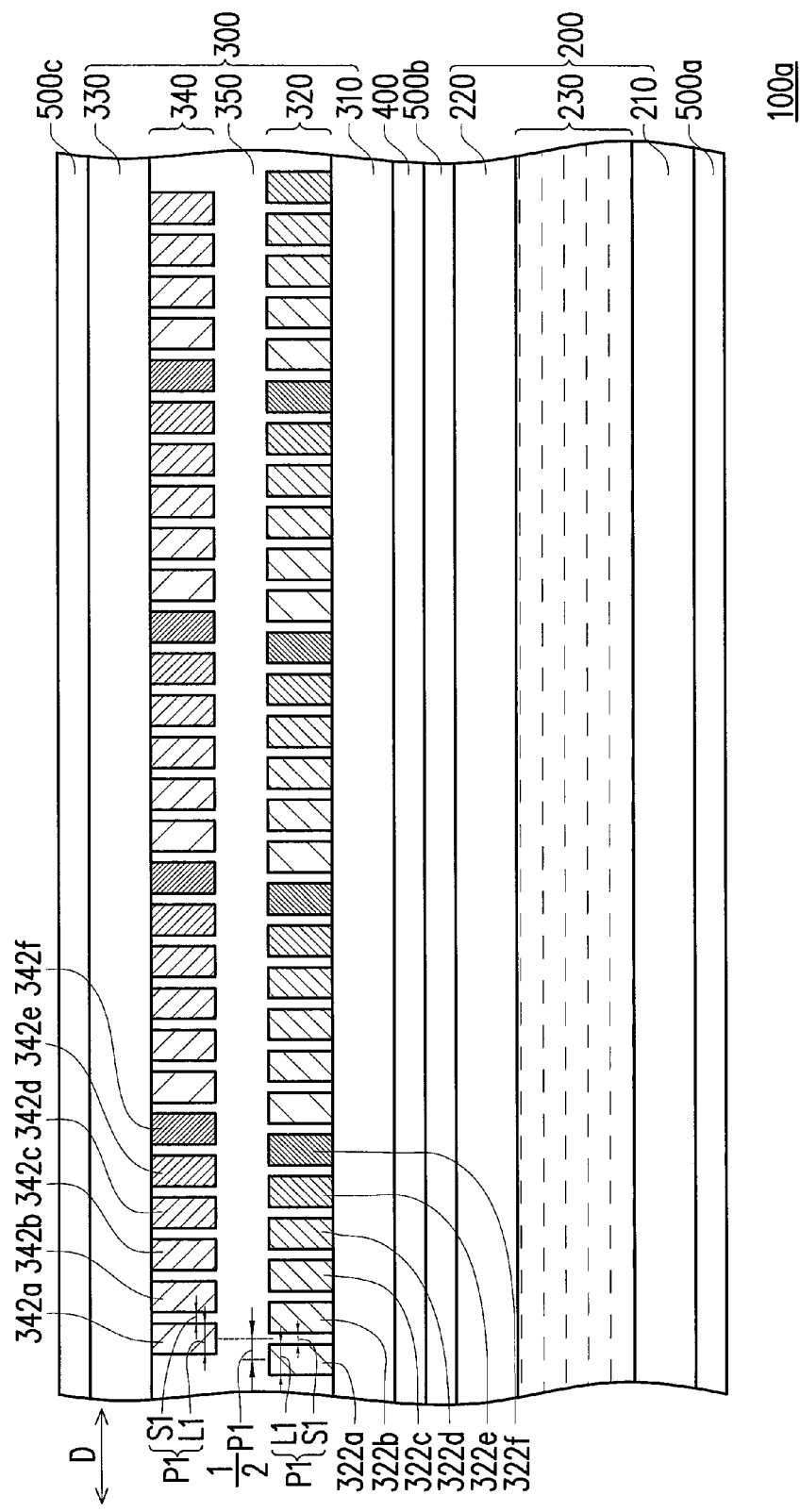
FIG. 4 is a cross-sectional schematic view of a stereoscopic display according to an embodiment of the disclosure.

Summing up from the above, it is known that the greater N is, the more preferable the effect of eye-tracking becomes. For example, to further reduce crosstalk, a design of N=6 is used a stereoscopic display 100a, as illustrated in FIG. 4, wherein four electrodes may be applied with the first electric potential in sequence to further reduce crosstalk. For example, first electrodes 322a, 322b, 322e, and 322f are applied with the first electric potential, and second electrodes 342a-342f and the first electrodes 322c and 322d are applied with the common electric potential, wherein the first electric potential is higher or lower than the common electric potential. Moreover, in some applications, in which crosstalk needs to be further reduced, a gray level of liquid crystal corresponding to a width of five electrodes may be set at 0 level in one time. For example, the first electrodes 322a-322e are applied with the first electric potential, and the first electrode 322f and the second electrodes 342a-342f are applied with the common electric potential. Thereby, the non-transparent area may be increased so that crosstalk is reduced. For some applications with preference to a higher transmittance, a gray level of liquid crystal corresponding to a width of three electrodes may be set at 0 level in one time. For example, the first electrodes 322a-322c are applied with the first electric potential, and the first electrodes 322d-322f and the second electrodes 342a-342f are applied with the common electric potential. Thereby, the non-transparent area may be decreased so that the transmittance is increased.

Since the eye-tracker 600 detects the location of the eyes of the viewer V and provides a signal to drive the barrier panel 300 based on the detection, driving of the barrier panel 300 is synchronized with the location of the viewer, making the optimal viewing area projected through the display panel 200 and the barrier panel 300 move with the viewer V, thereby achieving a stereoscopic display effect that is free of dead zone. In this way, the viewer is allowed to view a stereoscopic image with a preferable stereoscopic image quality when he/she moves at will, without being confined in the so-called appropriate image projection area. Therefore, the comfort of the viewer and quality of the stereoscopic image viewed by the viewer are allowed to be improved.

Summing up from the above, in the stereoscopic display and stereoscopic display device of the disclosure, the first patterned electrode layer and second patterned electrode layer of the barrier panel include the plurality of first electrodes and second electrodes that are spatially staggered to each other. Thereby, driving the electrode layer of the barrier panel when the eye-tracker is used allows the stereoscopic display to provide the optimal viewing area with lower or hardly any crosstalk based on the location of the viewer, thereby achieving the stereoscopic display effect that is free of dead zone. Consequently, the viewer is allowed to view a stereoscopic image with a preferable stereoscopic image quality when he/she moves at will, without being limited by the so-called appropriate image projection area. Therefore, the comfort of the viewer and quality of the stereoscopic image viewed by the viewer are allowed to be improved.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions. It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A stereoscopic display, comprising:
   a display panel including a plurality of left eye image pixels and a plurality of right eye image pixels, wherein the left eye image pixels and the right eye image pixels are in an alternate and contiguous arrangement; and
   a barrier panel, located at one side of the display panel, wherein the barrier panel comprises:
   a first substrate;
   a first patterned electrode layer, located on the first substrate and including M electrode sets, wherein each of the electrode sets includes N first electrodes, each of the first electrodes has a first line-width, a gap between the adjacent first electrodes is a first spacing, a first pitch is a sum of the first line-width and the first spacing, and M and N are positive integers;
   a second substrate, disposed opposite to the first substrate;
   a second patterned electrode layer, disposed on the second substrate and comprising a plurality of second electrodes, each of the second electrodes having the first line-width, wherein the gap between the adjacent second electrodes is the first spacing, the first electrodes and the second electrodes are staggered to each other, and a shift on a horizontal direction of the second electrodes relative to the first electrodes is half of the first pitch; and a liquid crystal layer including a plurality of liquid crystal particles, disposed between the first patterned electrode layer and the second patterned electrode layer, wherein a first group of the first electrodes is applied with a first electric potential while a second group of the first electrodes is applied with a common electric potential which is higher or lower than the first electric potential so that the liquid crystal particles corresponding to the first group of the first electrodes form shaded areas and that corresponding to the second group of the first electrodes form transparent areas, and wherein the transparent areas and the shaded areas are in an alternate and contiguous arrangement, and wherein each one of the shaded areas is overlapped with two neighboring left eye and right eye image pixels, and each one of the shaded areas is completely overlapped with two adjacent first electrodes and one of the second electrodes, and is further partially overlapped with two of the second electrodes which are adjacent to the one of the second electrodes.

2. The stereoscopic display as claimed in claim 1, wherein each of the second electrodes is correspondingly overlapped with two of the first electrodes that are adjacent.

3. The stereoscopic display as claimed in claim 1, wherein the first spacing is between 0 μm and 6 μm.

4. The stereoscopic display as claimed in claim 1, wherein the liquid crystal layer comprises a nematic positive liquid crystal or a nematic negative liquid crystal.

5. The stereoscopic display as claimed in claim 1, wherein the first electrodes comprise a plurality of strip electrodes arranged along a horizontal direction.

6. The stereoscopic display as claimed in claim 1, wherein the second electrodes comprise a plurality of strip electrodes arranged along a horizontal direction.

7. A stereoscopic display device, comprising:
the stereoscopic display as claimed in claim 1; and
an eye-tracker, detecting a relative location between a viewer and the display panel, wherein driving of the barrier panel is synchronized with detection of the eye-tracker.

8. The stereoscopic display device as claimed in claim 7, wherein each of the second electrodes is at least disposed at a position between two of the first electrodes that are adjacent.

9. The stereoscopic display device as claimed in claim 7, wherein the first spacing is between 0 μm and 6 μm.

10. The stereoscopic display device as claimed in claim 7, wherein the liquid crystal layer comprises a nematic positive liquid crystal or a nematic negative liquid crystal.

11. The stereoscopic display device as claimed in claim 7, wherein the first electrodes comprise a plurality of strip electrodes arranged along a horizontal direction.

12. The stereoscopic display device as claimed in claim 7, wherein the second electrodes comprise a plurality of strip electrodes arranged along a horizontal direction.

13. The stereoscopic display device as claimed in claim 7, wherein the eye-tracker comprises a lens or a G-sensor.

14. The stereoscopic display as claimed in claim 1, wherein a width of each of the shaded area is corresponded to a width of at least two of the first electrodes.

15. The stereoscopic display as claimed in claim 1, wherein N is an integer greater than or equal to 4.

16. The stereoscopic display as claimed in claim 1, wherein N is equal to 6, and wherein the first group of the first electrodes applied with the first electric potential includes four first electrodes while the second group of the first electrodes applied with the common electric potential which is higher or lower than the first electric potential includes two first electrodes.

17. The stereoscopic display as claimed in claim 1, wherein N is equal to 6, and wherein the first group of the first electrodes applied with the first electric potential includes five first electrodes while the second group of the first electrodes applied with the common electric potential which is higher or lower than the first electric potential includes one first electrode.

18. The stereoscopic display as claimed in claim 1, wherein N is equal to 6, and wherein the first group of the first electrodes applied with the first electric potential includes three first electrodes while the second group of the first electrodes applied with the common electric potential which is higher or lower than the first electric potential includes three first electrodes.

19. The stereoscopic display as claimed in claim 1, wherein for each of the electrode sets, the N first electrodes is electrically connected with and independently driven via respective N lead wires which are located at a same side of the first patterned electrode layer.

20. A stereoscopic display, comprising:
a display panel; and
a barrier panel, located at one side of the display panel, wherein the barrier panel comprises:
a first substrate;
a first patterned electrode layer, located on the first substrate and including M electrode sets, wherein each of the electrode sets includes N first electrodes, each of the first electrodes has a first line-width, a gap between the adjacent first electrodes is a first spacing, a first pitch is a sum of the first line-width and the first spacing, and M and N are positive integers;
a second substrate, disposed opposite to the first substrate;
a second patterned electrode layer, disposed on the second substrate and comprising a plurality of second electrodes, each of the second electrodes having the first line-width, wherein the gap between the adjacent second electrodes is the first spacing, the first electrodes and the second electrodes are staggered to each other, and a shift on a horizontal direction of the second electrodes relative to the first electrodes is half of the first pitch; and
a liquid crystal layer including a plurality of liquid crystal particles, disposed between the first patterned electrode layer and the second patterned electrode layer, wherein a first group of the first electrodes is applied with a first electric potential while a second group of the first electrodes is applied with a common electric potential which is higher or lower than the first electric potential so that the liquid crystal particles corresponding to the first group of the first electrodes form shaded areas and that corresponding to the second group of the first electrodes form transparent areas, and wherein the transparent areas and the shaded areas are in an alternate and contiguous arrangement, and wherein each one of the shaded areas is completely overlapped with two adjacent first electrodes and one of the second electrodes, and is further partially overlapped with two of the second electrodes which are adjacent to the one of the second electrodes.

21. A stereoscopic display, comprising:
a display panel; and
a barrier panel, located at one side of the display panel, wherein the barrier panel comprises:

a first substrate;
a first patterned electrode layer, located on the first substrate and including M electrode sets, wherein each of the electrode sets includes N first electrodes electrically connected with and independently driven via respective N lead wires which are located at a same side of the first patterned electrode layer, each of the first electrodes has a first line-width, a gap between the adjacent first electrodes is a first spacing, a first pitch is a sum of the first line-width and the first spacing, and M and N are positive integers;
a second substrate, disposed opposite to the first substrate;
a second patterned electrode layer, disposed on the second substrate and comprising a plurality of second electrodes, each of the second electrodes having the first line-width, wherein the gap between the adjacent second electrodes is the first spacing, the first electrodes and the second electrodes are staggered to each other, and a shift on a horizontal direction of the second electrodes relative to the first electrodes is half of the first pitch; and
a liquid crystal layer including a plurality of liquid crystal particles, disposed between the first patterned electrode layer and the second patterned electrode layer, wherein a first group of the first electrodes is applied with a first electric potential while a second group of the first electrodes is applied with a common electric potential which is higher or lower than the first electric potential so that the liquid crystal particles corresponding to the first group of the first electrodes form shaded areas and that corresponding to the second group of the first electrodes form transparent areas, and wherein the transparent areas and the shaded areas are in an alternate arrangement.

22. A stereoscopic display, comprising:
a display panel including a plurality of left eye image pixels and a plurality of right eye image pixels, wherein the left eye image pixels and the right eye image pixels are in an alternate and contiguous arrangement; and
a barrier panel, located at one side of the display panel, wherein the barrier panel comprises:
a first substrate;
a first patterned electrode layer, located on the first substrate and including M electrode sets, wherein each of the electrode sets includes N first electrodes electrically connected with and independently driven via respective N lead wires which are located at a same side of the first patterned electrode layer, each of the first electrodes has a first line-width, a gap between the adjacent first electrodes is a first spacing, a first pitch is a sum of the first line-width and the first spacing, and M and N are positive integers;
a second substrate, disposed opposite to the first substrate;
a second patterned electrode layer, disposed on the second substrate and comprising a plurality of second electrodes, each of the second electrodes having the first line-width, wherein the gap between the adjacent second electrodes is the first spacing, the first electrodes and the second electrodes are staggered to each other, and a shift on a horizontal direction of the second electrodes relative to the first electrodes is half of the first pitch; and
a liquid crystal layer including a plurality of liquid crystal particles, disposed between the first patterned electrode layer and the second patterned electrode layer, wherein a first group of the first electrodes is applied with a first electric potential while a second group of the first electrodes is applied with a common electric potential which is higher or lower than the first electric potential so that the liquid crystal particles corresponding to the first group of the first electrodes form shaded areas and that corresponding to the second group of the first electrodes form transparent areas, and wherein the transparent areas and the shaded areas are in an alternate and contiguous arrangement, and wherein each one of the shaded areas is overlapped with two neighboring left eye and right eye image pixels.

* * * * *